United States Patent [19]

Miyakawa

[11] Patent Number: 5,757,990
[45] Date of Patent: May 26, 1998

[54] OPTICAL SWITCH

[75] Inventor: Tosiya Miyakawa, Tokyo, Japan

[73] Assignee: NEC Corporation, Tokyo, Japan

[21] Appl. No.: 692,022

[22] Filed: Aug. 2, 1996

[30] Foreign Application Priority Data

Aug. 4, 1995 [JP] Japan ........................... 7-219709

[51] Int. Cl.$^6$ ........................................... G02B 6/26
[52] U.S. Cl. ........................... 385/16; 385/14; 385/15; 385/40; 385/45; 385/132
[58] Field of Search ............................. 385/15, 16, 24, 385/40, 43, 44, 45, 14, 130, 132

[56] References Cited

U.S. PATENT DOCUMENTS

| | | | |
|---|---|---|---|
| 4,737,002 | 4/1988 | Boucouvalas | 385/43 |
| 5,056,883 | 10/1991 | Diemeer et al. | 385/16 X |
| 5,163,106 | 11/1992 | Okayama et al. | 385/45 |
| 5,359,680 | 10/1994 | Riviere | 385/9 |
| 5,590,226 | 12/1996 | Wolf et al. | 385/45 |
| 5,623,568 | 4/1997 | Khan et al. | 385/45 |
| 5,640,471 | 6/1997 | Khan et al. | 385/17 |

OTHER PUBLICATIONS

"Integrated Oprics 4 × 4 Switch Matrix with Digital Optical Switches", Electronics Letters, Jan. 4, 1990, vol. 26, No. 1, pp. 4–5.

"Low Drive Voltage Y–Branch Digital Optical Switch", Electronics Letters, Jan. 3, 1991, vol. 27, No. 1, pp. 24–26.

*Primary Examiner*—Brian Healy
*Attorney, Agent, or Firm*—Ostrolenk, Faber, Gerb & Soffen, LLP

[57] ABSTRACT

Disclosed is an optical switch, which has: a substrate with electrooptic effect, wherein the substrate is provided with an incident-light waveguide, a tapered optical waveguide with a taper angle of θ1 which is connected to the incident-light waveguide and two arm optical waveguides with an aperture angle of θ2 therebetween which is connected to the tapered optical waveguide, the incident-light waveguide, the tapered optical waveguide and the two arm optical waveguides are formed on the substrate; and a plurality of control electrodes which are formed on the substrate; wherein the arm optical waveguides have a center-to-center interval of a value predetermined times a width of the arm optical waveguide at their ends where the arm optical waveguides is connected to the tapered optical waveguide, and the taper angle θ1 is greater than the aperture angle θ2.

5 Claims, 7 Drawing Sheets

OPTICAL SWITCH

FIELD OF THE INVENTION

This invention relates to a waveguide-type optical switch, and more particularly to a branched waveguide-type digital optical switch.

BACKGROUND OF THE INVENTION

In optical communication, an optical switch with a titanium-diffusion-type lithium niobate(LiNbO$_3$) waveguide has been expected to be a key device for an optical exchanger, optical cross connection etc.

In particular, a digital optical switch utilizing the change of optical field distribution has excellent characteristics that can bring a polarization-independent operation, high reliability and relaxation of fabrication tolerance, by giving a margin to an operating voltage.

Such conventional optical switches are generally composed of a Y-branched waveguide and control electrodes, for example, as described in Electron. Lett. vol.26, No.1, pp.4–5 (1990) and Electron. Lett. vol.27, No.1, pp.24–26(1991), which has properties to bring an operating voltage of ±35 to 60V and an extinction ratio of about 15 dB.

In the conventional optical switches, the switching is conducted by the change of optical field distribution based on the refractive index difference between arm optical waveguides that have an aperture angle θ therebetween.

However, in the conventional optical switches, there is a problem that they have a low efficiency in the change of optical field distribution to an applied voltage. Therefore, the operating voltage needs to be higher, thereby preventing the high-speed switching. Accordingly, the scope of the use of such optical switches is thereby limited.

SUMMARY OF THE INVENTION

Accordingly, it is an object of the invention to provide an optical switch which can be operated under the lower voltage.

It is a further object of the invention to provide an optical switch in which the crosstalk property can be improved.

According to the invention, an optical switch, comprises:

a substrate with electrooptic effect, wherein the substrate includes an incident-light waveguide, a tapered optical waveguide with a taper angle of θ1 which is connected to the incident-light waveguide and two arm optical waveguides with an aperture angle of θ2 therebetween which is connected to the tapered optical waveguide, the incident-light waveguide, the tapered optical waveguide and the two arm optical waveguides are formed on the substrate; and a plurality of control electrodes which are formed on the substrate;

wherein the arm optical waveguides have a center-to-center interval of a predetermined value times a width of the arm optical waveguide at their ends where the arm optical waveguides are connected to the tapered optical waveguide, and the taper angle θ1 is greater than the aperture angle θ2.

According to another aspect of the invention, an optical switch, comprises:

a substrate with electrooptic effect, wherein the substrate includes an incident-light waveguide and first and second optical waveguides branching from the incident-light waveguide, the incident-light waveguide and the first and second optical waveguides are formed on the substrate;

wherein ends of the first and second optical waveguides are apart from each other with a gap with a predetermined width at a starting position of the branching.

According to further aspect of the invention, an optical switch, comprises:

a substrate with electrooptic effect, wherein the substrate includes an incident-light waveguide, a Y-branched optical waveguide with a branching angle of θ1 which is connected to the incident-light waveguide and first and second optical waveguides which are connected to branches of the Y-branched optical waveguide, respectively with an aperture angle of θ2 therebetween, the incident-light waveguide, the Y-branched optical waveguide and the first and second optical waveguides are formed on the substrate;

wherein the branching angle θ1 of the Y-branched optical waveguide is greater than the aperture angle θ2 between the first and second optical waveguides.

In accordance with the invention, the two arm optical waveguides are apart from each other with a gap with a predetermined width at their ends where the incident-light waveguide is Y-branched through the tapered optical waveguide to connect to the two arm optical waveguide. Therefore, the equivalent refractive index at the center of the arm optical waveguide is reduced to weaken the light confinement therein. As a result, the efficiency of the field distribution change of the waveguided light to the applied voltage can be improved to reduce the consumption power.

In addition, replacing the tapered optical waveguide by the Y-branched optical waveguide, the disorder of the waveguided-light field distribution can be suppressed at the starting position of branching to improve the crosstalk property of the optical switch.

BRIEF DESCRIPTION OF THE DRAWINGS

The invention will be explained in more detail in conjunction with the appended drawings, wherein.

DESCRIPTION OF THE PREFERRED EMBODIMENTS

Figure 1A:
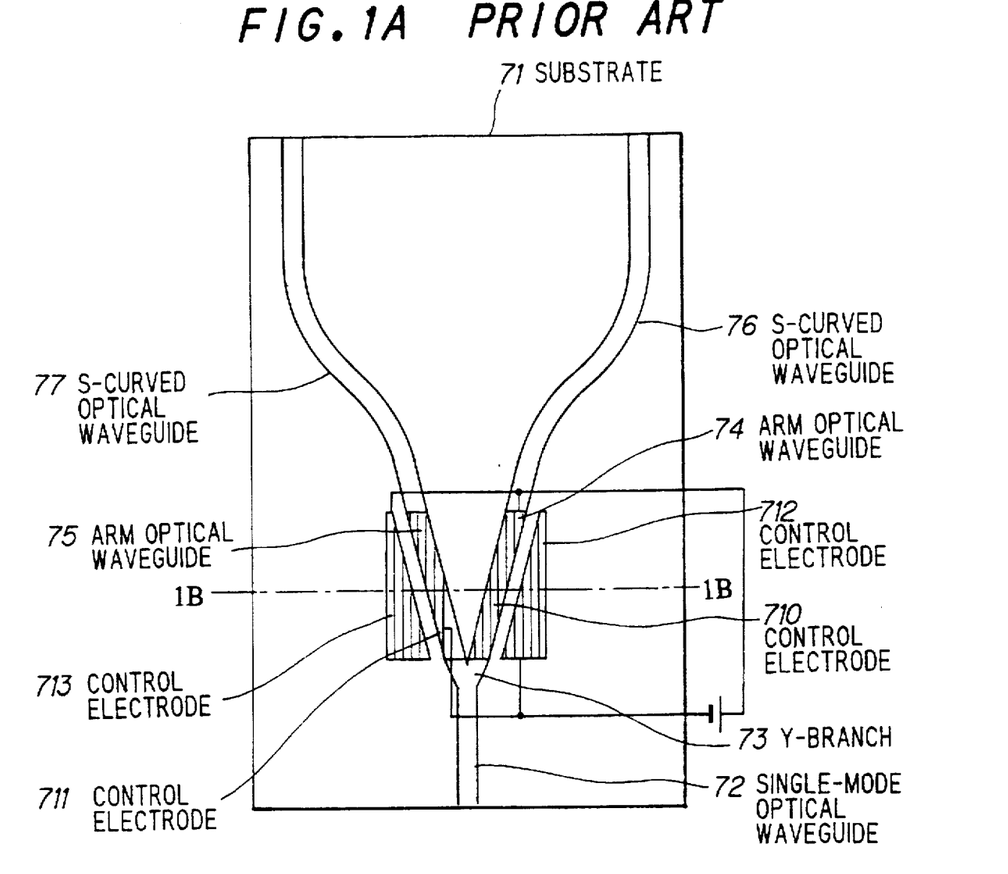
FIG. 1A is a plan view showing a conventional optical switch.
Figure 1B:
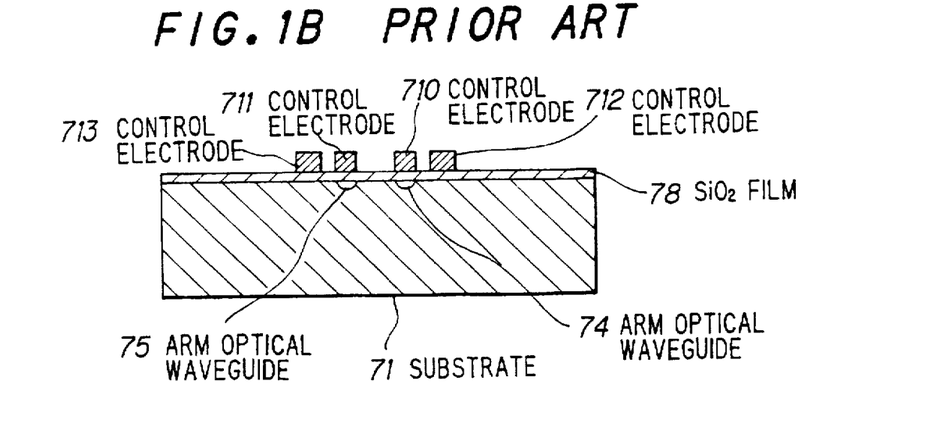
FIG. 1B is a cross sectional view cut along the line 1B—1B in FIG. 1A.

Before explaining an optical switch in the preferred embodiments, the aforementioned conventional digital optical switch will be explained in FIGS. 1A and 1B, wherein FIG. 1A is a plan view thereof and FIG. 1B is a cross sectional view cut along the line 1B—1B in FIG. 1A.

As shown in FIG. 1A, a single-mode optical waveguide 72 is formed by diffusing titanium on a Z-cut LiNbO$_3$ substrate 71.

The optical waveguide 72 is branched through a Y-branch 73 into two arm optical waveguides 74, 75, the interval between which is further enlarged by S-curved optical waveguides 76, 77 that are formed by connecting arcs.

As shown in FIG. 1B, on the Z-cut LiNbO$_3$ substrate 71, four control electrodes 710 to 713 are formed through a buffer layer 78 of SiO$_2$ film.

The control electrodes 710, 711 are located just over the arm optical waveguides 74, 75, respectively and the control electrodes 712, 713 are located with a gap of 5 to 10 μm from the control electrodes 710, 711, respectively.

Each of the control electrodes 710, 712 and 711, 713 is electrically connected therebetween and the electric potential with an equal amount and opposite polarities are applied to the control electrodes 710, 711.

When the positive potential is applied to the control electrode 710, the refractive index of the arm optical waveguide 74 is increased by the electrooptic effect and the refractive index of the arm optical waveguide 75 is contrarily decreased. Herein, when the light through the optical waveguide 72 reaches the arm optical waveguide, the field distribution of the light concentrates on the side of the arm optical waveguide 74 with the higher refractive index.

Therefore, if the refractive index difference between the arm optical waveguides 74, 75 is sufficiently big, i.e., the potential difference applied between the control electrodes 710, 711, the light will be almost emitted from the S-curved optical waveguide 76 on the side of the arm optical waveguide 74.

On the contrary, when the negative potential is applied to the control electrode 710 and the positive potential is applied to the control electrode 711, the light will be emitted from the S-curved optical waveguide 77 and the light emitted from the S-curved optical waveguide 76 will be decreased.

Figure 2A:
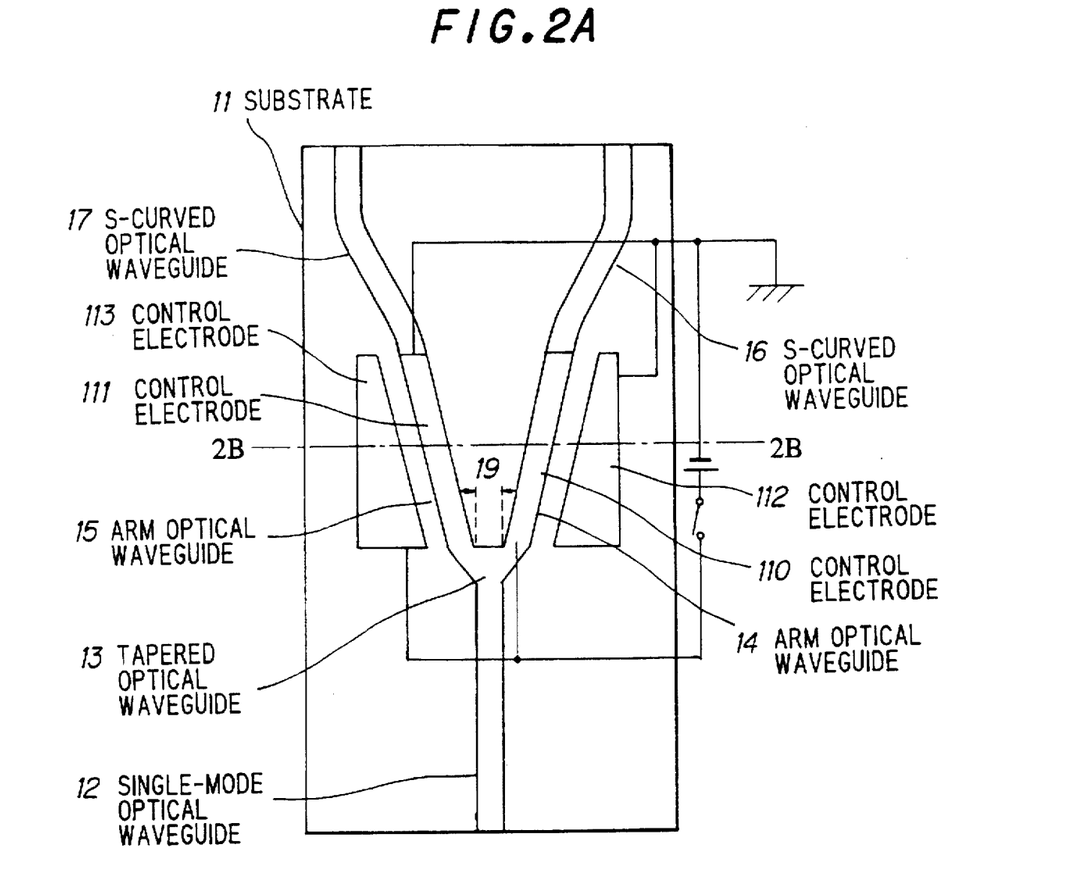
FIG. 2A is a plan view showing an optical switch in a first preferred embodiment according to the invention.
Figure 2B:
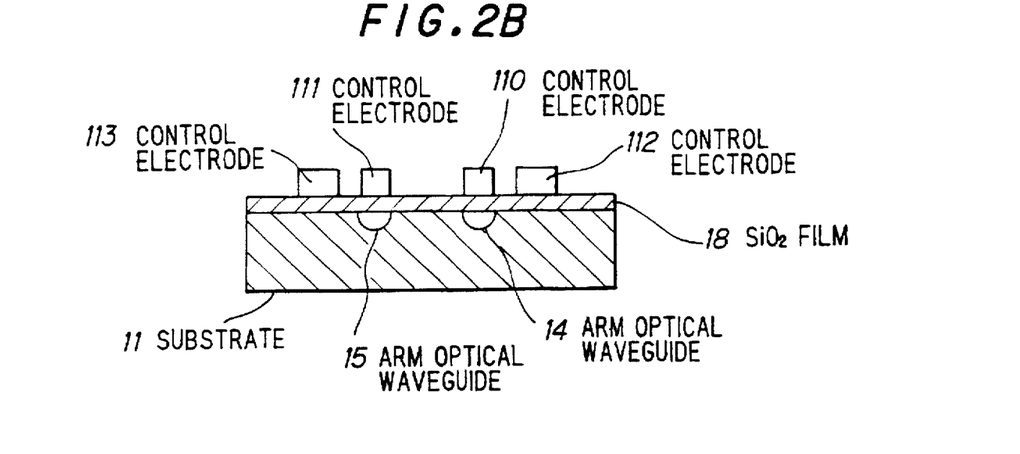
FIG. 2B is a cross sectional view cut along the line 2B—2B in FIG. 2A.
Figure 3:
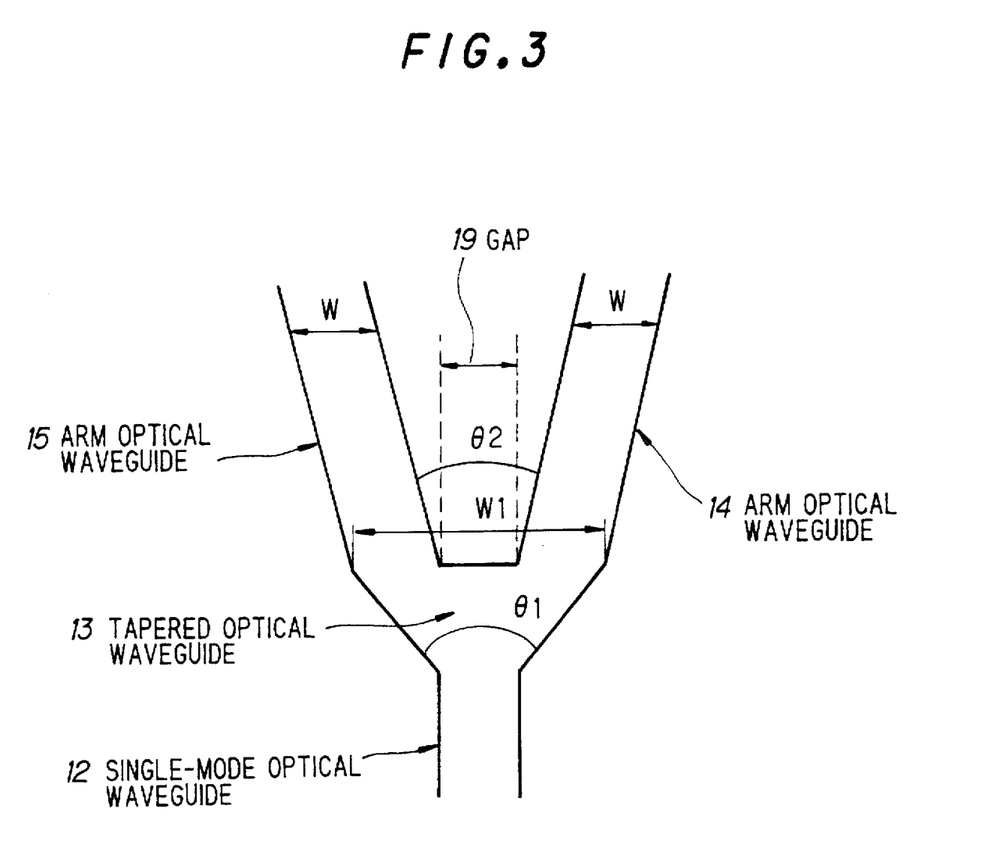
FIG. 3 is an enlarged view showing a branching part of the optical waveguide in FIG. 2A.

Next, a digital optical switch in the first preferred embodiment will be explained in FIGS. 2A to 3, wherein FIG. 2A is a plan view thereof, FIG. 2B is a cross sectional view cut along the line 2B—2B in FIG. 2A and FIG. 3 is an enlarged view showing a branching part of the optical waveguide.

As shown in FIG. 2A, a single-mode optical waveguide 12 is formed by diffusing titanium on a Z-cut LiNbO$_3$ substrate 11. The single-mode optical waveguide 12 has, as more clearly shown in FIG. 3, a waveguide width enlarged at a tapered optical waveguide 13 with a taper angle of θ1. Two arm optical waveguides 14, 15 with an aperture angle of θ2 are branched from the tapered portion. Further, the interval of the two optical waveguides is enlarged with S-curved optical waveguides 16, 17 that are formed by connecting arcs.

As shown in FIG. 2B, on the Z-cut LiNbO$_3$ substrate 11, four control electrodes 110 to 113 are formed through a buffer layer 18 of SiO$_2$ film. The control electrode 110 is located over the arm optical waveguides 14 and the control electrodes 111 is located over the arm optical waveguide 15. The control electrodes 112, 113 are located with a gap of 5 to 10 μm from the control electrodes 110, 111, respectively.

Each of the control electrodes 110, 112 and 111, 113 is electrically connected therebetween and the electric potential with an equal amount and opposite polarities are applied to the control electrodes 110, 111.

In this embodiment, as shown in FIG. 3, the enlarged width W1 of the tapered optical waveguide 13 is more than two times the width W of the respective arm optical waveguides 14, 15. The inside ends of the arm optical waveguides 14, 15 are apart from each other to have a gap 19 (hereinafter referred to as 'branching gap') when connecting to the tapered optical waveguide 13. The branching gap 19 reduces the equivalent refractive index at the center of the arm optical waveguide to weaken the light confinement. Therefore, the efficiency of the field distribution change of the waveguided light to the applied voltage can be improved to reduce the consumption power.

Figure 4:
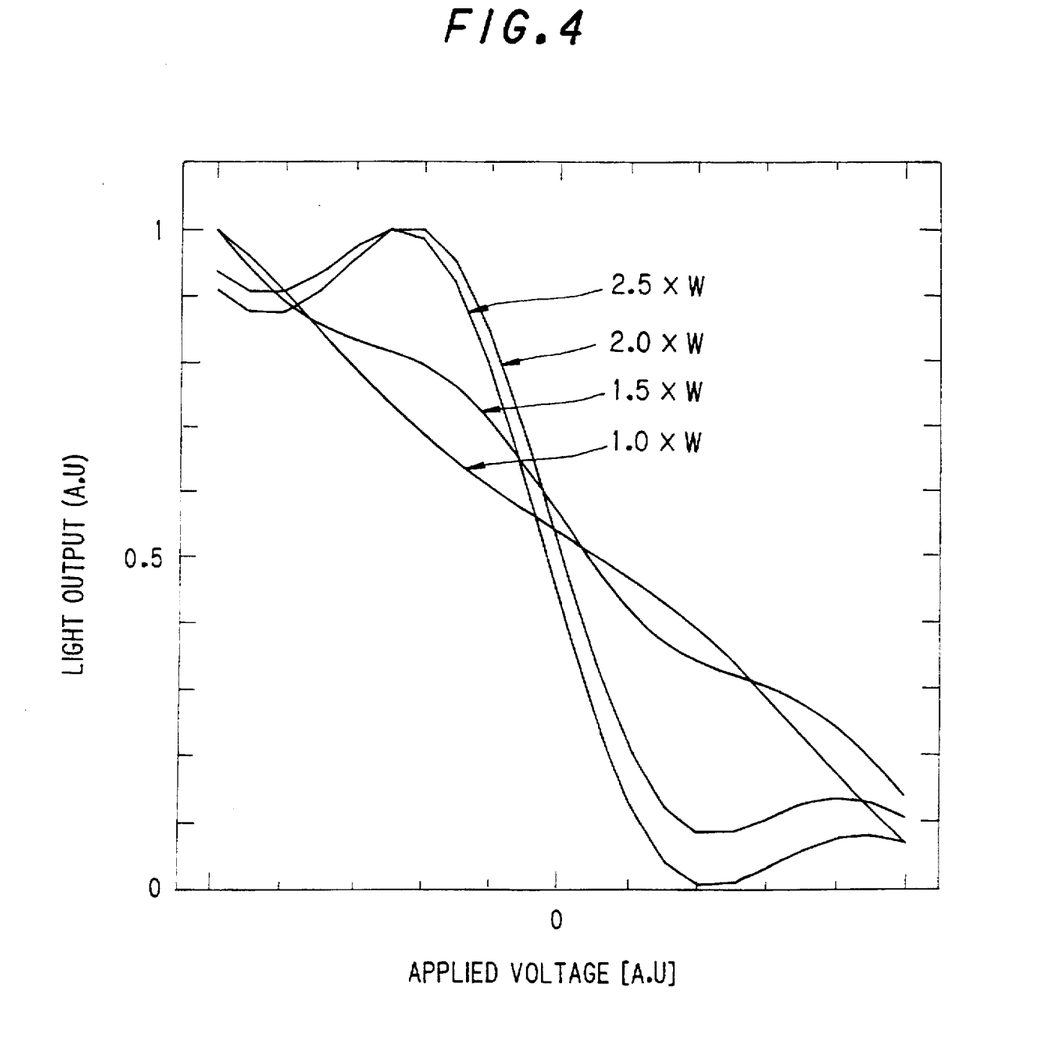
FIG. 4 shows applied voltage to light output characteristics in the first embodiment.

For example, when the waveguide width W is 8 μm, the aperture angle θ1 is 4 mrad and the aperture angle θ2 between the arm optical waveguides 14, 15 is 1.5 mrad, the voltage-light output characteristics calculated is shown in FIG. 4. In FIG. 4, the center-to-center interval of the arm optical waveguides 14, 15 is set to be 2.5, 2, 1.5 and 1(=the conventional layout) times the width W of the waveguides, respectively. Herein, these interval values correspond to that the branching gap is set to be 1.5, 1, 0.5, 0(=no branching gap) times the width W of the waveguide, respectively.

As seen from FIG. 4, in this embodiment, when the center-to-center interval of the arm optical waveguides 14, 15 is about two or more times the width W of the waveguide, the operating voltage for the switching control can be significantly reduced compared with that in the conventional layout.

Figure 5A:
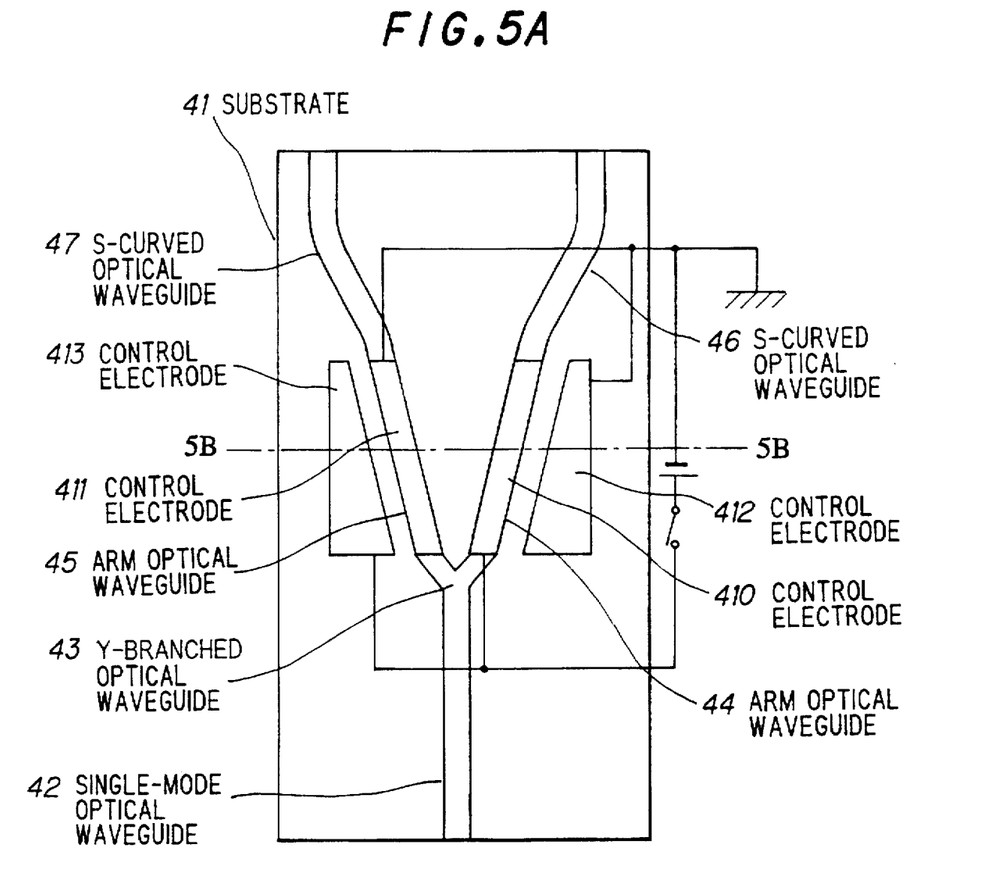
FIG. 5A is a plan view showing an optical switch in a second preferred embodiment according to the invention.
Figure 5B:
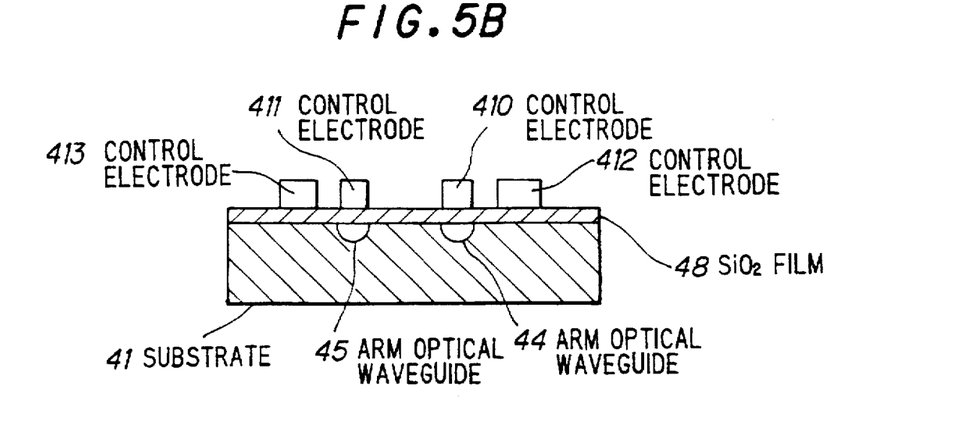
FIG. 5B is a cross sectional view cut along the line 5B—5B in FIG. 5A.
Figure 6:
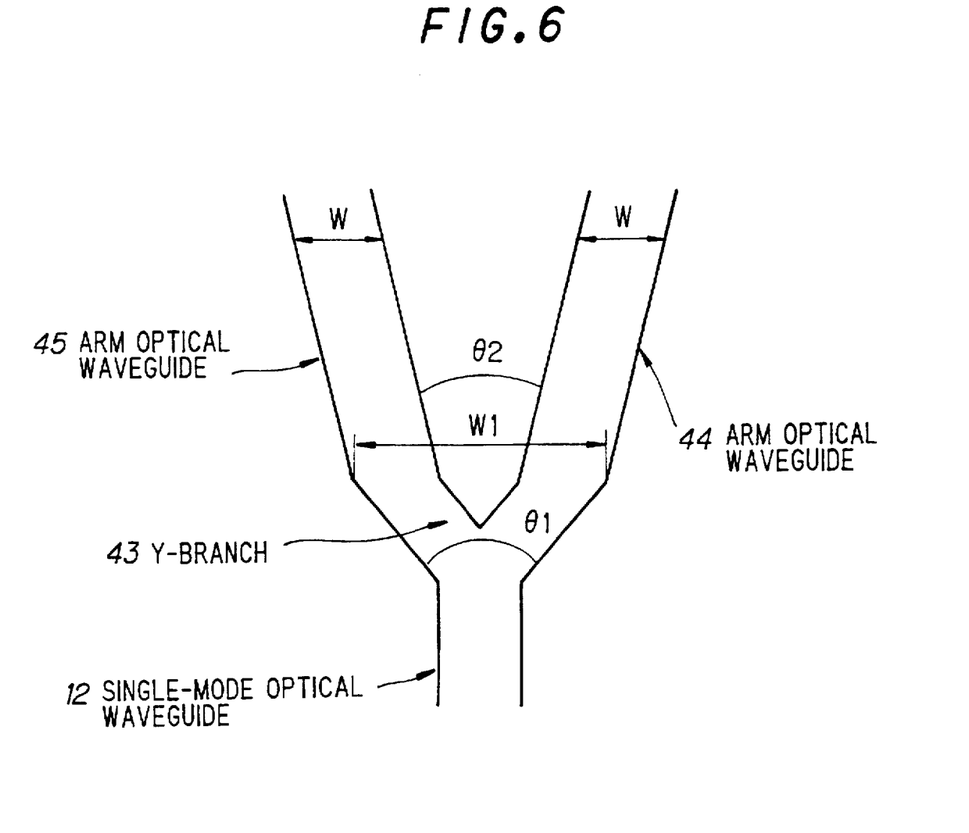
FIG. 6 is an enlarged view showing a branching part of the optical waveguide in FIG. 5A.

Furthermore, a digital optical switch in the second preferred embodiment will be explained in FIGS. 5A to 6, wherein FIG. 5A is a plan view thereof, FIG. 5B is a cross sectional view cut along the line 5B—5B in FIG. 5A and FIG. 6 is an enlarged view showing a branching part of the optical waveguide.

In the second embodiment, a Y-branched optical waveguide 43 with a branch angle of θ1 is employed in place of the tapered optical waveguide 13 in the first embodiment. Therefore, the disorder of the waveguided-light field distribution can be suppressed at the starting position of branching to improve the crosstalk property of the optical switch.

Figure 7:
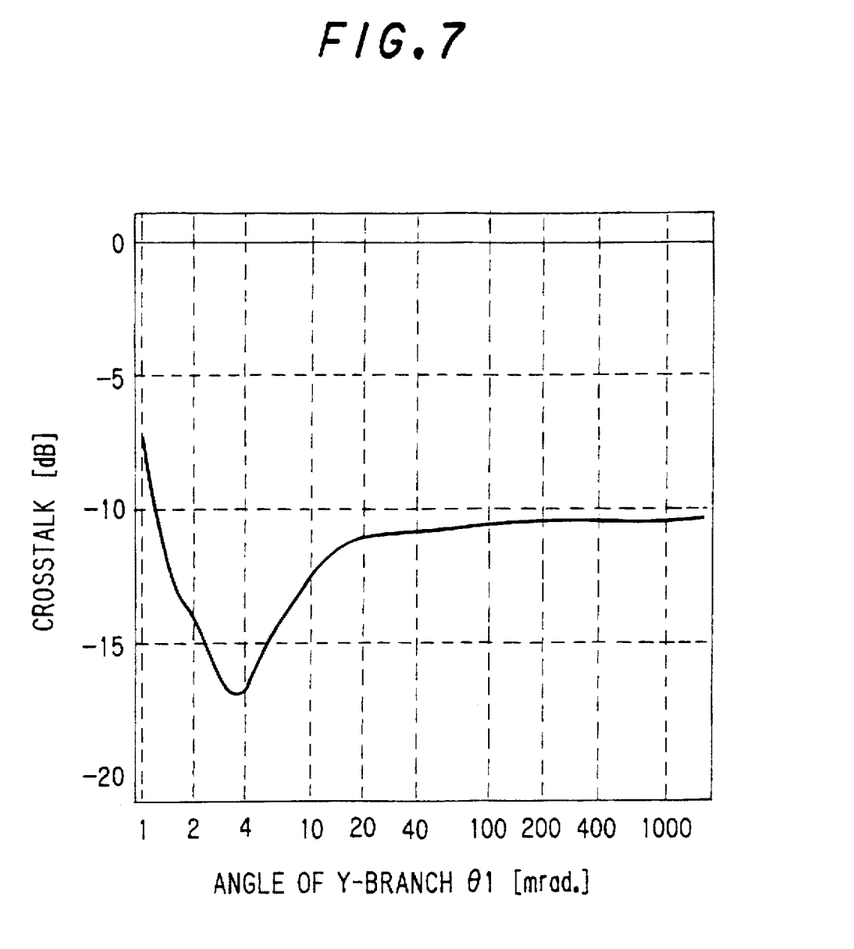
FIG. 7 shows angle of Y-branch to crosstalk characteristics in the second embodiment.

For example, when the waveguide width W is 8 μm, the center-to-center interval of arm optical waveguides 44, 45 at their ends is 12 μm and the aperture angle θ2 between the arm optical waveguides 44, 45 is 1.5 mrad, the angle of Y-branch to crosstalk characteristics calculated is shown in FIG. 7. As seen from FIG. 7, in this embodiment, the crosstalk can be reduced less than 17 dB, where the angle of Y-branch θ1 is 4 mrad.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical switch comprising:
   a substrate with electrooptic effect, said substrate including an incident-light waveguide, a tapered optical waveguide with a taper angle of θ1 connected to said incident-light waveguide and two arm optical waveguides with an aperture angle of θ2 therebetween connected to said tapered optical waveguide, said incident-light waveguide, said tapered optical waveguide and said two arm optical waveguides being formed on said substrate; and
   a plurality of control electrodes formed on said substrate;

wherein said arm optical waveguides have a center-to-center interval of a predetermined value times a width of said arm optical waveguides at their ends where said arm optical waveguides are connected to said tapered optical waveguide, and said taper angle θ1 is greater than said aperture angle θ2.

2. An optical switch according to claim 1, wherein said center-to-center interval of said arm optical waveguides at said ends is 1.1 to 3.0 times said width of said arm optical waveguide.

3. An optical switch comprising:

a substrate with electrooptic effect, said substrate including an incident-light waveguide, a Y-branched optical waveguide with a branching angle of θ1 connected to said incident-light waveguide and two arm optical waveguides with an aperture angle of θ2 therebetween connected to said Y-branched optical waveguide, said incident-light waveguide, said Y-branched optical waveguide and said two arm optical waveguides being formed on said substrate; and a plurality of control electrodes formed on said substrate;

wherein said arm optical waveguides have a center-to-center interval of a predetermined value times a width of said arm optical waveguides at their ends where said arm optical waveguides are connected to said Y-branched optical waveguide, and said branching angle θ1 is greater than said aperture angle θ2.

4. An optical switch according to claim 3, wherein said center-to-center interval of said arm optical waveguides at said ends is 1.1 to 3.0 times said width of said arm optical waveguide.

5. An optical switch comprising:

a substrate with electrooptic effect, said substrate including an incident-light waveguide and first and second optical waveguides branching from said incident-light waveguide, said incident-light waveguide and said first and second optical waveguides being formed on said substrate; and a tapered optical waveguide formed between said incident-light waveguide and said first and second optical waveguides;

wherein ends of said first and second optical waveguides are separated by a gap of a predetermined width at a starting position of said branching; and wherein said first and second optical waveguides have an aperture angle of θ2 therebetween, and a taper angle θ1 of said tapered optical waveguide is greater than said aperture angle θ2.

* * * * *